US008635660B2

(12) United States Patent
Ng et al.

(10) Patent No.: US 8,635,660 B2
(45) Date of Patent: *Jan. 21, 2014

(54) DYNAMIC CONSTRAINTS FOR QUERY OPERATIONS

(75) Inventors: Raymond K. Ng, San Jose, CA (US);
Ganesh Kirti, Santa Clara, CA (US);
Thomas Keefe, Mill Valley, CA (US);
Naresh Kumar, San Jose, CA (US)

(73) Assignee: Oracle International Corporation, Redwood Shore, CA (US)

( * ) Notice: Subject to any disclaimer, the term of this patent is extended or adjusted under 35 U.S.C. 154(b) by 1922 days.

This patent is subject to a terminal disclaimer.

(21) Appl. No.: 11/296,027

(22) Filed: Dec. 6, 2005

(65) Prior Publication Data

US 2007/0130616 A1 Jun. 7, 2007

(51) Int. Cl.
*H04L 29/06* (2006.01)
*G06F 17/30* (2006.01)
*H04L 9/32* (2006.01)
*G06F 17/00* (2006.01)
*G06F 15/16* (2006.01)

(52) U.S. Cl.
USPC ................ 726/1; 726/27; 713/165; 713/166; 713/168; 707/694; 709/219

(58) Field of Classification Search
USPC ........ 713/182, 166, 165, 168; 707/101, 10, 3, 707/694; 717/133; 718/104; 705/9, 37; 709/100, 219; 726/4, 1, 27
See application file for complete search history.

(56) References Cited

U.S. PATENT DOCUMENTS

| | | | |
|---|---|---|---|
| 6,285,989 B1* | 9/2001 | Shoham | 705/37 |
| 6,961,728 B2* | 11/2005 | Wynblatt et al. | 707/10 |
| 7,155,720 B2* | 12/2006 | Casati et al. | 718/104 |
| 7,240,015 B1 | 7/2007 | Karmouch et al. | |
| 7,437,718 B2* | 10/2008 | Fournet et al. | 717/133 |
| 7,945,960 B2 | 5/2011 | Ng et al. | |
| 2001/0023421 A1 | 9/2001 | Numao et al. | |
| 2002/0188869 A1 | 12/2002 | Patrick | |
| 2003/0149714 A1* | 8/2003 | Casati et al. | 709/100 |
| 2004/0190721 A1 | 9/2004 | Barrett et al. | |

(Continued)

OTHER PUBLICATIONS

G. Graefe; Dynamic query evaluation plans; Year of Publication: 1989; ACM New York, NY, USA ; pp. 358-366.*

(Continued)

*Primary Examiner* — Aravind Moorthy
(74) *Attorney, Agent, or Firm* — Kilpatrick Townsend & Stockton LLP

(57) ABSTRACT

Systems, methods, and machine-readable media are disclosed for providing dynamic and/or conditional constraints on queries based on an external security policy. In one embodiment, a method is provided which comprises receiving from a user a request to access a resource. A condition clause can be read from a grant statement defined in the security policy. The grant statement can define permission for the user to access the requested resource. In some cases, the grant statement can comprise a Java Authentication and Authorization Service (JAAS) grant statement. A query associated with the requested access can be modified based on the permission granted to the user. The modified query can then be made to perform the requested access.

25 Claims, 5 Drawing Sheets

(56) References Cited

U.S. PATENT DOCUMENTS

| | | | |
|---|---|---|---|
| 2005/0097353 A1 | 5/2005 | Patrick et al. | |
| 2005/0187809 A1* | 8/2005 | Falkenhainer | 705/9 |
| 2005/0210296 A1* | 9/2005 | Devine et al. | 713/201 |
| 2006/0015483 A1* | 1/2006 | Gownder | 707/3 |
| 2006/0020813 A1* | 1/2006 | Birk et al. | 713/182 |
| 2006/0026667 A1* | 2/2006 | Bhide et al. | 726/1 |
| 2006/0161568 A1* | 7/2006 | Dettinger et al. | 707/101 |
| 2006/0195816 A1 | 8/2006 | Grandcolas et al. | |
| 2007/0136819 A1 | 6/2007 | Ng et al. | |

OTHER PUBLICATIONS

U.S. Appl. No. 11/296,086, filed Dec. 6, 2005, Advisory Action mailed Aug. 31, 2010, 3 pages.

U.S. Appl. No. 11/296,086, filed Dec. 6, 2005, Final Office Action mailed Jun. 22, 2010, 10 pages.

U.S. Appl. No. 11/296,086, filed Dec. 6, 2005, Office Action mailed Dec. 10, 2009, 10 pages.

U.S. Appl. No. 11/296,086, filed Dec. 6, 2005, Notice of Allowance mailed Jan. 3, 2011, 6 pages.

\* cited by examiner

DYNAMIC CONSTRAINTS FOR QUERY OPERATIONS

BACKGROUND OF THE INVENTION

Embodiments of the present invention relate generally to the field of system and/or data security and more particularly to providing dynamic and/or conditional constraints on queries based on an external security policy.

Security policies for accessing computer systems or resources can be "hard-coded" into applications that control access to those systems or resources. For example, an application controlling access to a file or group of files can include code for authenticating and/or authorizing a user requesting to access a file. While effective, such an approach presents problems in that it is rather inflexible. That is, since the security policy is hard-coded into the application, changing the policy generally requires recoding and recompiling the source code of the application. For large systems, this can be time consuming and inefficient. Furthermore, code revisions present the possibility of new problems or bugs being introduced into the systems requiring time and effort to troubleshoot or creating new vulnerabilities for the system.

Recently, attempts to address some of these problems have been made with the introduction of externally configurable, i.e., dynamic, security policies that can be changed without modifying the application code. One example of an approach that provides an externally configurable security policy is the Java Authentication and Authorization Service (JAAS). As is known in the art, JAAS provides methods for controlling login, authentication, authorization and other access control functions. JAAS methods can use external configuration files in which a security policy can be defined. Applications using JAAS to control access to resources can pass the path of the configuration file to the JAAS runtime during JVM startup. In this way, the applications do not need to include code defining the security policy. Rather, the policy is defined externally and can be changed by modifying the configuration file without modifying the code of the application.

However, such an approach still has drawbacks. Primarily, the external configuration files and methods that use the files to control access to resources do not allow for conditional definitions in the security policy. That is, the statements in the configuration file grant particular users or groups of users permission to access particular resources or groups of resources. However, these statements do not allow for granting of such permission only if a condition is met. For example, a security policy may be desired in which managers are allowed to modify records of only those employees who report to that manager. A security policy defined in a JAAS configuration file cannot define a policy with such a condition. Rather, the configuration file would need to list exactly those files to which the manager could be granted access. Such a definition would require significant administrative overhead to manage and maintain as work assignments and employees change.

Furthermore, external security policies such as those defined in a JAAS policy provide no way of constraining database or other queries (e.g. LDAP, XML Repository, Application Metadata Repository, Web Services Directory, etc.). The typical use of JAAS for authorization involves the use of the checkPermission( ) method call to find out if the currently authenticated user is granted a specific permission in the statically-declared policy. Thus, in cases where retrievals of large data sets from backend repositories are needed and the data sets need to be secured, a typical application utilizing JAAS would first retrieve all data sets from the backend repository and then call checkPermission on each data set that is returned. This approach is highly undesirable because a high level of network overhead will be incurred as data sets will be returned as part of the query. Performance will be further degraded due to the numerous checkPermission method calls on each of the returned data set. Furthermore, security concerns will be created as the retrieved/cached data sets will need to be protected from malicious attacks both while on the network and while in the middle-tier cache.

Ideally, if the queries can be dynamically modified to only return the data sets that the currently authenticated user is authorized to retrieve, better performance, lower network and/or computation overhead, and better security in the middle-tier can be achieved. In such a case, once the data sets are returned, the application does not need to perform another authorization check on each of the returned data set as these data sets have been pre-determined by the query mechanism to be viewable or readable by the currently authenticated user. A hard-coded security policy can provide not only for conditional grants of permission, by can dynamically generate and/or constrain a query that is tailored to the permissions granted to a user requesting an access. However, external security policies do not provide this flexibility.

Hence, there is a need in the art for dynamic and/or conditional constraints on queries based on an external security policy.

BRIEF SUMMARY OF THE INVENTION

Systems, methods, and machine-readable media are disclosed for providing dynamic and/or conditional constraints on queries based on an external security policy. In one embodiment, a method of constraining a database query based on an externally defined security policy is provided which comprises receiving from a user a request to access a resource. A condition clause can be read from a grant statement defined in the security policy. The grant statement can define permission for the user to access the requested resource. In some cases, the grant statement can comprise a Java Authentication and Authorization Service (JAAS) grant statement. A query associated with the requested access can be modified based on the permission granted to the user. The modified query can then be made to perform the requested access.

According to another embodiment, the method can further comprise retrieving one or more query predicates associated with the permission granted to the user. In such a case, modifying the query can comprise appending the retrieved predicates to the query associated with the requested access. In some cases, the predicate can comprise a Structured Query Language (SQL) sub-expression such as, for example, an SQL WHERE clause. Retrieving one or more query predicates associated with permissions granted to the user can comprise calling a method for reading one or more attributes of a permission instance granted to the user. The one or more attributes of a permission instance granted to a user can comprise an attribute of a subject, an attribute of an object, and/or an attribute of an environmental variable.

Importantly, while discussed herein with reference to SQL, the various embodiments discussed herein are not limited to SQL/database queries but rather can be applied to any type of repository For example, LDAP queries can be constrained by specifying dynamic controls or filters while XML Repository queries can be constrained by XPath-based filters. In yet another example, application-specific Metadata Repositories can be constrained by repository/query-language specific filter.

According to other embodiments of the present invention, systems and machine-readable are disclosed for providing dynamic and/or conditional constraints on queries based on an external security policy. In various embodiments, constraining a database query based on an externally defined security policy is provided which comprises receiving from a user a request to access a resource. A condition clause can be read from a grant statement defined in the security policy. The grant statement can define permission for the user to access the requested resource. In some cases, the grant statement can comprise a Java Authentication and Authorization Service (JAAS) grant statement. A query associated with the requested access can be modified based on the permission granted to the user. The modified query can then be made to perform the requested access.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Embodiments of the present invention provide methods, system and machine-readable media for providing dynamic and/or conditional constraints on queries based on an external security policy. As defined herein, an external security policy is a security policy that is defined outside of, such as in a configuration file separate from, the code that enforces the policy. Generally speaking, constraining a database query based on an externally defined security policy can comprise receiving from a user a request to access a resource. A condition clause can be read from a grant statement defined in the security policy. The grant statement can define permission for the user to access the requested resource. In some cases, the grant statement can comprise a Java Authentication and Authorization Service (JAAS) grant statement. A query associated with the requested access can be modified based on the permission granted to the user. The modified query can then be made to perform the requested access.

More specifically, constraining a database query based on an externally defined security policy can comprise receiving from a user a request to access a resource. A condition clause can be read from a grant statement, such as a JAAS grant statement, defined in the security policy. The grant statement can define permission for the user to access the requested resource. A permission granted to the user requesting access can be based on the condition clause. One or more query predicates, such as SQL WHERE clauses, associated with permission granted to the user can be retrieved. A query associated with the requested access can be modified based on the retrieved query predicates, such as by appending the predicates to the query. The modified query can then be made to perform the requested access.

Importantly, while embodiments of the present invention are discussed herein with reference to JAAS, it should be understood that these embodiments are not limited to use with JAAS. Rather, it should be understood that other types of access control systems can be used with the various embodiments discussed herein. Embodiments of the present invention are thought to be equally useful with other systems using an externally defined security policy.

Figure 1:
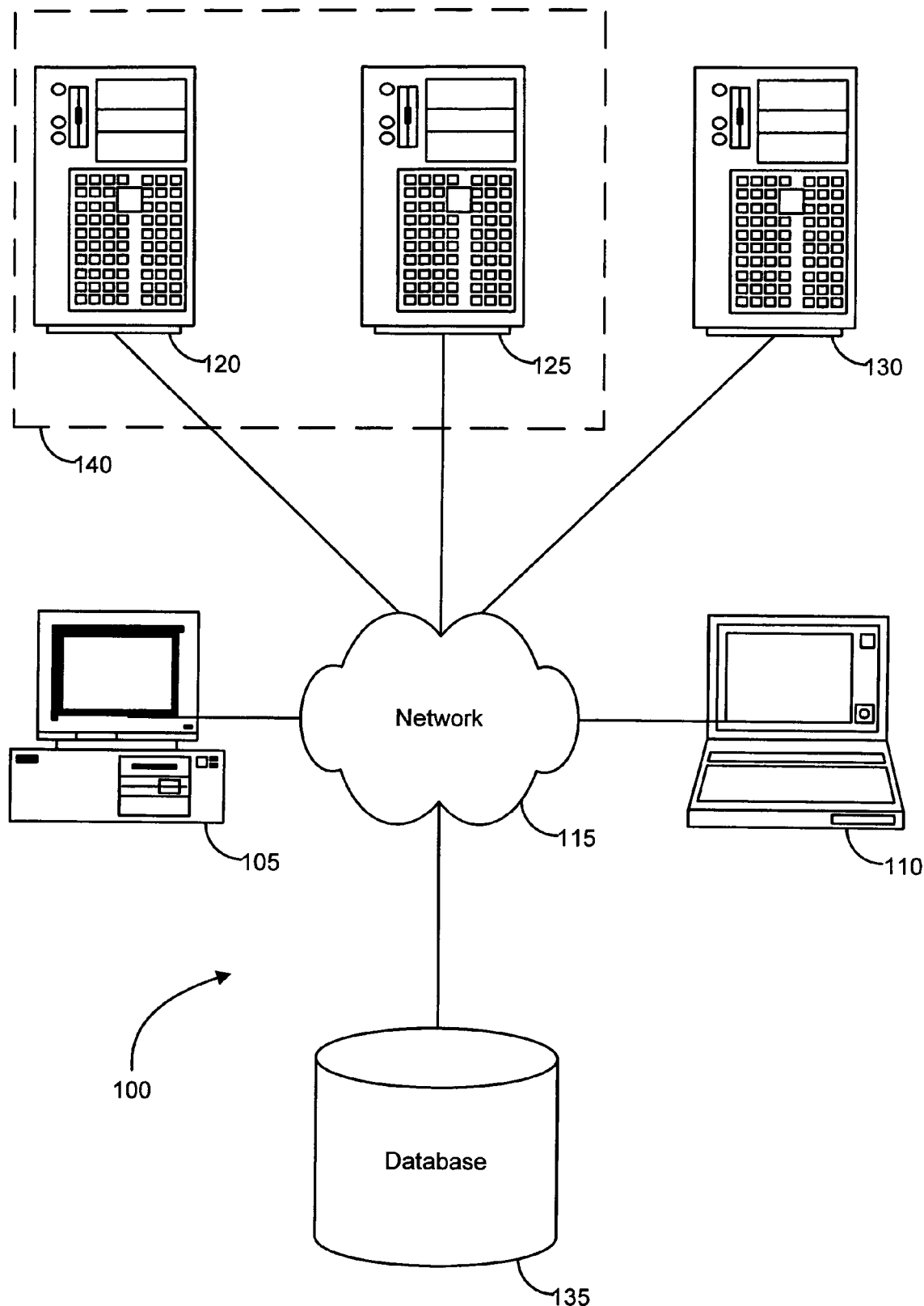
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running a mid-tier application, such as a business application, a web server, application server, etc. Such servers may be used to process requests (including client work requests) from user computers 105, 110. The mid-tier applications can also include any number of applications for controlling access to resources of the servers 120, 125, 130. Such applications may be implemented, for example, using JAAS or another system that that uses an externally defined security policy for controlling access to the resources.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle, Microsoft, Sybase™, IBM™ and the like, which can process requests from database clients running on a user computer 105, 110.

In some embodiments, a mid-tier application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to a mid-tier application and/or a database server. Those skilled in the art will recognize that the functions described with respect to various types of servers may be performed by a single server and/or a plurality of specialized servers, depending on implementation-specific needs and parameters.

In accordance with some embodiments, one or more servers (e.g., 120, 125) may be database servers and/or may be configured to operate in a clustered environment (as indicated by the broken line 140 of FIG. 1). As defined herein, a cluster of computers can include one or more computers that are configured to operate in coordinated fashion, e.g., by providing parallel processing of instructions, responding to job requests cooperatively, maintaining multiple instances of an application and/or a database, and/or the like. In particular embodiments, a cluster may be configured to provide many database services, and/or each member ("node") of a cluster may be configured to operate an RDBMS (such as Oracle 10 g), which may be a cluster-aware. Optionally, each server 120, 125 can have a separate instance of a database managed by that database management program. The cluster, therefore, can provide database services on a scalable, high-availability basis familiar to those skilled in the art. Each of the servers 120, 125 may also include one or more "clusterware" programs familiar to those skilled in the art. One example of a clusterware program that may be employed in various embodiments is Oracle's Cluster Ready Services ("CRS"). In some cases, a particular server may be configured to run both an RDBMS and one or more mid-tier applications. In other cases, a service may execute on one or many instances of the cluster.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10 g, that is adapted to store, update, and retrieve data in response to SQL-formatted commands.

In particular embodiments, each database server 120, 125 (and/or each cluster node) may include its own database (which is shown on FIG. 1, for ease of illustration, as a single database 135), which may be stored local to that server, on a network (including a SAN), etc. In some of these embodiments, each server's database may be an instance of a common, clustered database, an arrangement familiar to those skilled in the art. In other embodiments, each database server 120, 125 may be configured to access a common instance of the database 135.

Figure 2:
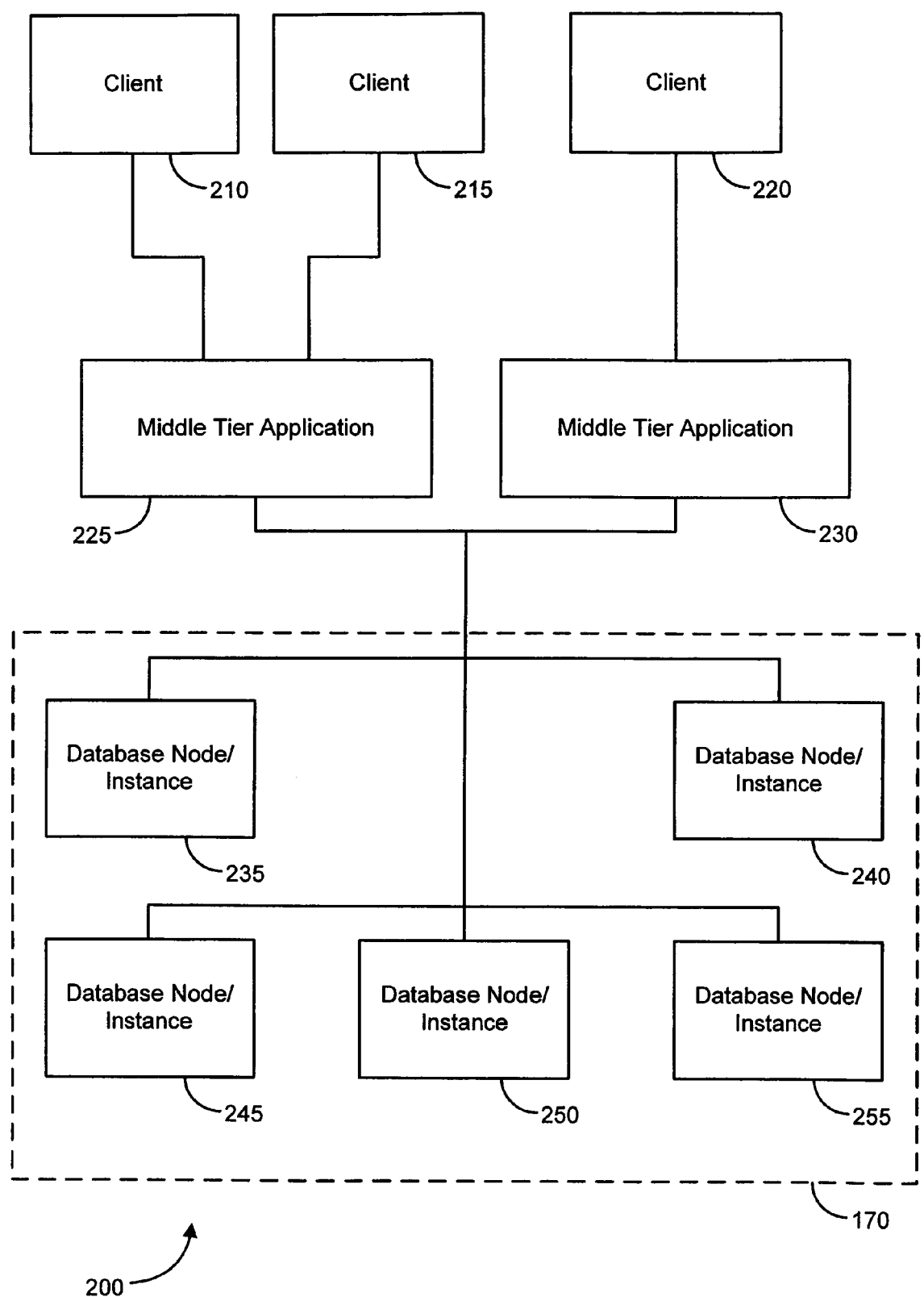
FIG. 2 is a block diagram of a multi-tiered database system in which various embodiments of the present invention may be implemented.

FIG. 2 is a block diagram of a multi-tiered system 200, in which various embodiments of the present invention may be implemented. The system 200 may include one or more clients 210-220 (such as, for example, the clients described above), which may be running on an end user computer. Each of the clients may be in communication with one or more mid-tier applications 160, which, in turn, may be in communication with a database 235-255 (in some cases, this communication may be mediated by an RDBMS). As noted above, the mid-tier application 160 can include any number of applications for controlling access to resources. Such applications may be implemented, for example, using JAAS or another system that that uses an externally defined security policy for controlling access to the resources. In various embodiments, as described above, the database 235-255 may comprise a plurality of instances (e.g., 235-255). In particular embodiments, each of the instances may be part of a cluster arrangement (denoted by the box 205). Thus, the system 200 may include a session and/or connection pooling scheme, whereby a client and/or mid-tier application simply submits a work request to a set of pooled sessions/connections, and the RDBMS allocates the work request based on node/instance availability, load balancing considerations, etc.

Figure 3:
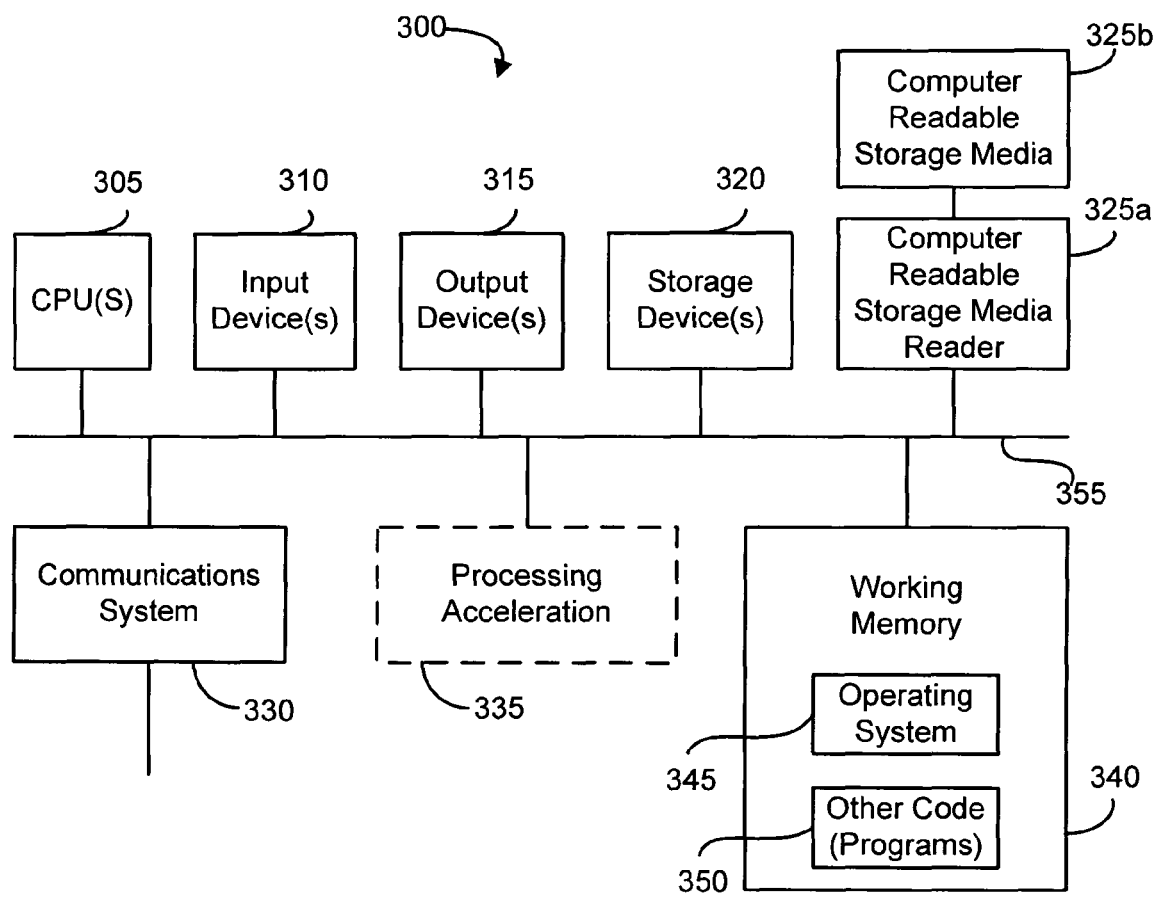
FIG. 3 is a block diagram illustrating an exemplary computer system in which embodiments of the present invention may be implemented.

FIG. 3 illustrates an exemplary computer system 300, in which various embodiments of the present invention may be implemented. The system 300 may be used to implement any of the computer systems described above such as the server computers or the user computers. The computer system 300 is shown comprising hardware elements that may be electrically coupled via a bus 355. The hardware elements may include one or more central processing units (CPUs) 305, one or more input devices 310 (e.g., a mouse, a keyboard, etc.), and one or more output devices 315 (e.g., a display device, a printer, etc.). The computer system 300 may also include one or more storage device 320. By way of example, storage device(s) 320 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 325*a*, a communications system 330 (e.g., a modem, a network card (wireless or wired), an infra-red communication device, etc.), and working memory 340, which may include RAM and ROM devices as described above. In some embodiments, the computer system 300 may also include a processing acceleration unit 335, which can include a DSP, a special-purpose processor and/or the like.

The computer-readable storage media reader 325*a* can further be connected to a computer-readable storage medium 325*b*, together (and, optionally, in combination with storage device(s) 320) comprehensively representing remote, local, fixed, and/or removable storage devices plus storage media for temporarily and/or more permanently containing computer-readable information. The communications system 330 may permit data to be exchanged with the network 120 and/or any other computer described above with respect to the system 100.

The computer system 300 may also comprise software elements, shown as being currently located within a working memory 340, including an operating system 345 and/or other code 350, such as an application program (which may be a client application, web browser, mid-tier application, RDBMS, etc.). The application programs may have and/or designed to implement methods of the invention.

It should be appreciated that alternate embodiments of a computer system 400 may have numerous variations from that described above. For example, customized hardware might also be used and/or particular elements might be implemented in hardware, software (including portable software, such as applets), or both. Further, connection to other computing devices such as network input/output devices may be employed. Software of computer system 300 may include code 350 for providing conditional grants of permission in an externally defined security policy.

Generally speaking, a method of providing dynamic and/or conditional constraints on queries based on an external security policy can comprise receiving from a user a request to access a resource. A condition clause can be read from a grant statement defined in the security policy. The grant statement can define permission for the user to access the requested resource. In some cases, the grant statement can comprise a Java Authentication and Authorization Service (JAAS) grant statement. A query associated with the requested access can be modified based on the permission granted to the user. The modified query can then be made to perform the requested access.

Figure 4:
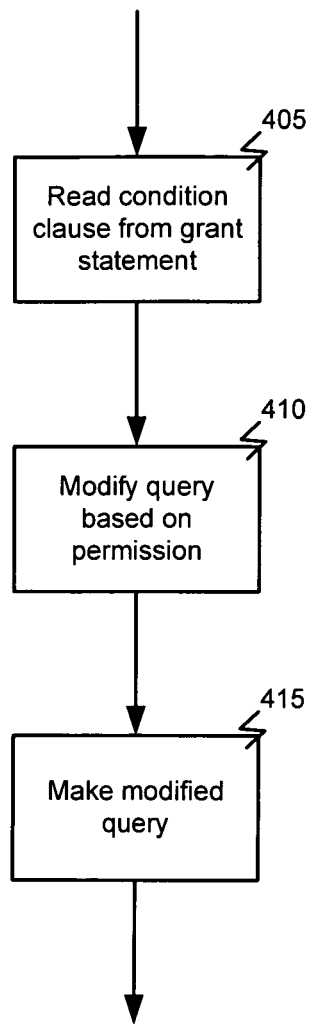
FIG. 4 is a flowchart illustrating, at a high level, a process for providing conditional constraints on query operations based on grants of permission in an externally defined security policy according to one embodiment of the present invention.

FIG. 4 is a flowchart illustrating, at a high level, a process for providing conditional constraints on query operations based on grants of permission in an externally defined security policy according to one embodiment of the present invention. Such a process can be initiated, for example, by a user attempting to access one or more resources such as files, database records, devices, etc. that are subject to a security policy. In some cases, the process may be initiated by the user or an application being executed by or for the user issuing or initiating a database or other query operation.

In this example, the process begins with reading 405 a condition clause from a grant statement defined in the security policy. The grant statement can define permission for the user to access the requested resource. As described in co-pending U.S. patent application Ser. No. 11/296,086 filed on Dec. 6, 2005 and titled "Dynamic Conditional Security Policy Extensions" which is hereby incorporated by reference in its entirety, a grant statement, such as a JAAS grant statement can be extended to include a condition clause further defining the grant of permission. As used herein, the condition clause of the grant statement can also be used to constrain query operations.

Therefore, a query associated with the requested access can be modified 410 based on the permission granted to the user. That is, based on the condition clause of the grant statement, a query can be modified to access only those records or resources for which the user has permission to access. The query associated with the requested access can be a query issued or initiated by the user or an application executed by or for the user. In other cases, the query may be stored in the security policy as part of or separate from the grant statement or in another file or location separate from the security policy.

Finally, the modified query can be made 415 to perform the requested access. Therefore, in general, providing dynamic and/or conditional constraints on queries based on an external security policy can comprise reading a condition clause from a grant statement defined in the external security policy, modifying a query associated with the requested access based on the permission granted to the user, i.e., in light of the condition clause, and making or issuing the modified query to perform the requested access.

More specifically, and as will be discussed in detail below with reference to FIG. 5, constraining a database query based on an externally defined security policy can comprise, according to one embodiment of the present invention, receiving from a user a request to access a resource. A condition clause can be read from a grant statement, such as a JAAS grant statement, defined in the security policy. The grant statement can define permission for the user to access the requested resource. A permission granted to the user requesting access can be based on the condition clause. One or more query predicates, such as SQL WHERE clauses, associated with permission granted to the user can be retrieved. A query associated with the requested access can be modified based on the retrieved query predicates, such as by appending the predicates to the query. The modified query can then be made to perform the requested access.

Figure 5:
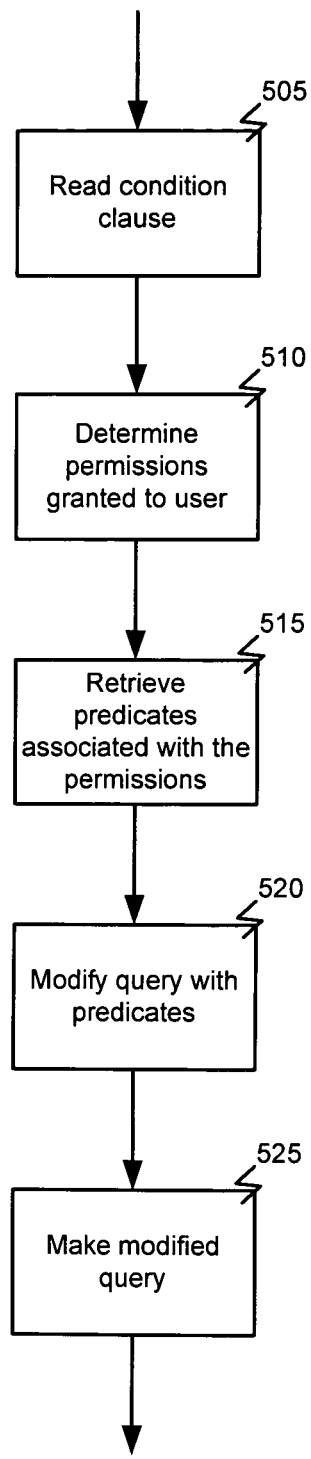
FIG. 5 is a flowchart illustrating additional details of a process for providing conditional constraints on query operations based on grants of permission in an externally defined security policy according to an alternative embodiment of the present invention.

FIG. 5 is a flowchart illustrating a process for providing a conditional grant of permission to a user based on an externally defined security policy according to an alternative embodiment of the present invention. As in the previous example discussed above with reference to FIG. 4, this process may begin in response to a user attempting to access one or more resources that are subject to a security policy. For example, the process may be initiated by the user or an application being executed by or for the user issuing or initiating a database or other query operation.

In this example, the process begins with reading 505 a condition clause from a grant statement defined in the security policy. As noted above, the grant statement can define permission for the user to access the requested resource and further include condition clause further defining the grant of permission.

A permission granted to the user requesting access can be determined 510 based on the condition clause.

One or more query predicates associated with permission granted to the user can be retrieved 515. According to one embodiment of the present invention, the query predicate can comprise a Structured Query Language (SQL) sub-expression. In such cases, the SQL sub-expression can comprise, for example, an SQL WHERE clause. Retrieving one or more query predicates associated with permissions granted to the user can comprise calling a method for reading one or more attributes of a permission instance granted to the user. The one or more attributes of a permission instance granted to a user can comprise an attribute of a subject, an attribute of an object, and/or an attribute of an environmental variable.

A query associated with the requested access can be modified 520 based on the retrieved query predicates. Modifying the query can comprise appending the retrieved predicates to the query associated with the requested access. As noted above, the query associated with the requested access can be a query issued or initiated by the user or an application executed by or for the user. In other cases, the query may be stored in the security policy as part of or separate from the grant statement or in another file or location separate from the security policy.

Finally, the modified query can be made 525 to perform the requested access. So, for example, the grant statement defined in the external security policy may take the form of:

```
grant oracle.sql.DBPrinciple "*" {
permission oracle.sql.SQLPermission "EMP", "QUERY",
    WHERE EMP.MANAGER=${subject.id}"
```

In this example, the condition clause of the grant statement is the "WHERE EMP.MANAGER=$ {subject.id}" clause which can be used as a predicate of an SQL query. Therefore, the grant statement in this example can be interpreted as granting permission to the principle, in this case the current user, to query the EMP record if the current user is identified as the manager in the MANAGER field of the EMP record (i.e., "WHERE EMP.MANAGER=$ {subject.id}") This WHERE clause can be appended to the query used to access the requested record. In this way, the query is constrained within the limits defined by the condition clause of the grant statement.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

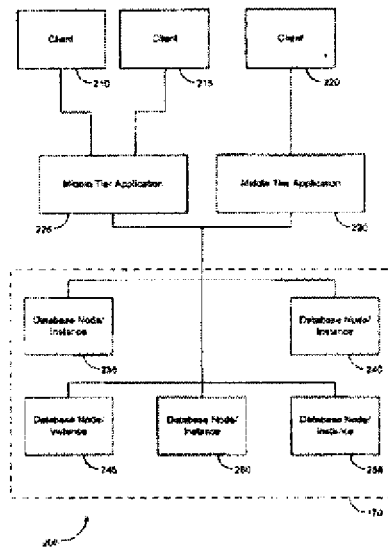

What is claimed is:

1. A method of constraining a database query based on an externally defined security policy, the method comprising:

receiving at an application server from a user a query comprising a request to access a resource;

reading with an application executing on the application server a condition clause from a grant statement defined in the security policy, the grant statement defining permission for the user to access the requested resource wherein the security policy is external to the application and wherein the application controls access to the resource;

retrieving with the application executing on the application server one or more query predicates from the security policy and associated with the permission granted to the user;

modifying the received query with the application executing on the application server based on the permission granted to the user wherein modifying the query comprises dynamically constraining the query prior to making the query by appending the retrieved predicates to the query associated with the requested access; and making the modified query with the application executing on the application server to perform the requested access.

2. The method of claim 1, wherein the predicate comprises a Structured Query Language (SQL) sub-expression.

3. The method of claim 2, wherein the SQL sub-expression comprises an SQL WHERE clause.

4. The method of claim 1, wherein retrieving one or more query predicates associated with permissions granted to the user comprises calling a method for reading one or more attributes of a permission instance granted to the user.

5. The method of claim 4, wherein the one or more attributes of a permission instance granted to a user comprise an attribute of a subject.

6. The method of claim 4, wherein the one or more attributes of a permission instance granted to a user comprise an attribute of an object.

7. The method of claim 4, wherein the one or more attributes of a permission instance granted to a user comprise an attribute of an environmental variable.

8. The method of claim 1, wherein the grant statement comprises a Java Authentication and Authorization Service (JAAS) grant statement.

9. A method of constraining a database query based on an externally defined security policy, the method comprising:

receiving at an application server from a user a query comprising a request to access a resource;

reading with an application executing on the application server a condition clause from a grant statement defined in the security policy, the grant statement defining permission for the user to access the requested resource wherein the security policy is external to the application and wherein the application controls access to the resource;

determining a permission granted to a user requesting access with the application executing on the application server based on the condition clause;

retrieving with the application executing on the application server from the grant statement one or more query predicates associated with permission granted to the user;

modifying the query with the application executing on the application server based on the retrieved query predicates wherein modifying the query comprises dynamically constraining the query with the retrieved query predicates prior to making the query; and making the modified query with the application executing on the application server to perform the requested access.

10. The method of claim 9, wherein modifying the query comprises appending the retrieved predicates to the query associated with the requested access.

11. The method of claim 9, wherein the predicate comprises a Structured Query Language (SQL) sub-expression.

12. The method of claim 11, wherein the SQL sub-expression comprises an SQL WHERE clause.

13. The method of claim 9, wherein retrieving one or more query predicates associated with permissions granted to the user comprises calling a method for reading one or more attributes of a permission instance granted to the user.

14. The method of claim 13, wherein the one or more attributes of a permission instance granted to a user comprise an attribute of a subject.

15. The method of claim 13, wherein the one or more attributes of a permission instance granted to a user comprise an attribute of an object.

16. The method of claim 13, wherein the one or more attributes of a permission instance granted to a user comprise an attribute of an environmental variable.

17. The method of claim 9, wherein the grant statement comprises a Java Authentication and Authorization Service (JAAS) grant statement.

18. A method of constraining a database query based on an externally defined security policy, the method comprising:
   receiving at an application server from a user a query comprising a request to access a resource;
   reading with an application executing on the application server a condition clause from a Java Authentication and Authorization Service (JAAS) grant statement defined in the security policy, the grant statement defining permission for the user to access the requested resource and one or more query predicates associated with the permission wherein the security policy is external to the application and wherein the application controls access to the resource;
   determining a permission granted to a user requesting access with the application executing on the application server based on the condition clause;
   retrieving with the application executing on the application server the one or more query predicates associated with permission granted to the user;
   modifying the query with the application executing on the application server based on the permission granted to the user wherein modifying the query comprises dynamically constraining the query prior to making the query by appending the retrieved predicates to the query; and
   making the modified query with the application executing on the application server to perform the requested access.

19. The method of claim 18, wherein the predicate comprises a Structured Query Language (SQL) sub-expression.

20. The method of claim 19, wherein the SQL sub-expression comprises an SQL WHERE clause.

21. The method of claim 18, wherein retrieving one or more query predicates associated with permissions granted to the user comprises calling a method for reading one or more attributes of a permission instance granted to the user.

22. The method of claim 21, wherein the one or more attributes of a permission instance granted to a user comprise an attribute of a subject.

23. The method of claim 21, wherein the one or more attributes of a permission instance granted to a user comprise an attribute of an object.

24. The method of claim 21, wherein the one or more attributes of a permission instance granted to a user comprise an attribute of an environmental variable.

25. A system comprising:
   a processor; and
   a memory coupled with and readable by the processor and storing a set of instructions which, when executed by the processor, causes the processor to constrain a database query based on an externally defined security policy by:
      receiving at an application server from a user a query comprising a request to access a resource;
      reading with an application executing on the application server a condition clause from a grant statement defined in the security policy, the grant statement defining permission for the user to access the requested resource wherein the security policy is external to the application and wherein the application controls access to the resource;
      retrieving with the application executing on the application server one or more query predicates from the security policy and associated with the permission granted to the user;
      modifying the received query with the application executing on the application server based on the permission granted to the user wherein modifying the query comprises dynamically constraining the query prior to making the query by appending the retrieved predicates to the query associated with the requested access; and
      making the modified query with the application executing on the application server to perform the requested access.

* * * * *

UNITED STATES PATENT AND TRADEMARK OFFICE
CERTIFICATE OF CORRECTION

PATENT NO. : 8,635,660 B2
APPLICATION NO. : 11/296027
DATED : January 21, 2014
INVENTOR(S) : Ng et al.

It is certified that error appears in the above-identified patent and that said Letters Patent is hereby corrected as shown below:

Please delete title page and replace with attached title page.

In the Drawings

On Sheet 2 of 5, in drawings, in figure 2, line 11, delete "170" and insert -- 205 --, therefor.

In the Specification

In column 4, line 51, delete "may can" and insert -- can --, therefor.

In column 5, line 12, delete "that that" and insert -- that --, therefor.

In column 6, line 43, delete "that that" and insert -- that --, therefor.

Signed and Sealed this
Seventh Day of July, 2015

Michelle K. Lee
*Director of the United States Patent and Trademark Office*

(12) United States Patent
Ng et al.

(10) Patent No.: US 8,635,660 B2
(45) Date of Patent: *Jan. 21, 2014

(54) DYNAMIC CONSTRAINTS FOR QUERY OPERATIONS

(75) Inventors: Raymond K. Ng, San Jose, CA (US); Ganesh Kirti, Santa Clara, CA (US); Thomas Keefe, Mill Valley, CA (US); Naresh Kumar, San Jose, CA (US)

(73) Assignee: Oracle International Corporation, Redwood Shore, CA (US)

(*) Notice: Subject to any disclaimer, the term of this patent is extended or adjusted under 35 U.S.C. 154(b) by 1922 days.

This patent is subject to a terminal disclaimer.

(21) Appl. No.: 11/296,027

(22) Filed: Dec. 6, 2005

(65) Prior Publication Data
US 2007/0130616 A1 Jun. 7, 2007

(51) Int. Cl.
| H04L 29/06 | (2006.01) |
| G06F 17/30 | (2006.01) |
| H04L 9/32 | (2006.01) |
| G06F 17/00 | (2006.01) |
| G06F 15/16 | (2006.01) |

(52) U.S. Cl.
USPC .......... 726/1; 726/27; 713/165; 713/166; 713/168; 707/694; 709/219

(58) Field of Classification Search
USPC ...... 713/182, 166, 165, 168; 707/101, 10, 3; 707/694; 717/133; 718/104; 705/9, 37; 709/100, 219; 726/4, 1, 27
See application file for complete search history.

(56) References Cited

U.S. PATENT DOCUMENTS

| 6,285,989 B1 * | 9/2001 | Shoham .................... 705/37 |
| 6,961,728 B2 * | 11/2005 | Wynblatt et al. ........... 707/10 |
| 7,155,720 B2 * | 12/2006 | Casati et al. ............. 718/104 |
| 7,240,015 B1 | 7/2007 | Karmouch et al. |
| 7,437,718 B2 * | 10/2008 | Fournet et al. ............ 717/133 |
| 7,945,960 B2 | 5/2011 | Ng et al. |
| 2001/0023421 A1 | 9/2001 | Numao et al. |
| 2002/0188869 A1 | 12/2002 | Patrick |
| 2003/0149714 A1 * | 8/2003 | Casati et al. ............. 709/100 |
| 2004/0190721 A1 | 9/2004 | Barrett et al. |

(Continued)

OTHER PUBLICATIONS

G. Graefe; Dynamic query evaluation plans; Year of Publication: 1989; ACM New York, NY, USA ; pp 358-366 *

(Continued)

*Primary Examiner* — Aravind Moorthy
(74) *Attorney, Agent, or Firm* — Kilpatrick Townsend & Stockton LLP

(57) ABSTRACT

Systems, methods, and machine-readable media are disclosed for providing dynamic and/or conditional constraints on queries based on an external security policy. In one embodiment, a method is provided which comprises receiving from a user a request to access a resource. A condition clause can be read from a grant statement defined in the security policy. The grant statement can define permission for the user to access the requested resource. In some cases, the grant statement can comprise a Java Authentication and Authorization Service (JAAS) grant statement. A query associated with the requested access can be modified based on the permission granted to the user. The modified query can then be made to perform the requested access.

25 Claims, 5 Drawing Sheets